United States Patent
Hsieh et al.

(10) Patent No.: US 12,224,547 B2
(45) Date of Patent: Feb. 11, 2025

(54) LASER DEVICE AND METHOD OF USING THE SAME

(71) Applicant: Taiwan Semiconductor Manufacturing Company, Ltd., Hsinchu (TW)

(72) Inventors: Yu-Hua Hsieh, Hsinchu (TW); Ying-Yen Tseng, Hsinchu (TW); Wen-Yu Ku, Hsinchu (TW); Kei-Wei Chen, Tainan (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 337 days.

(21) Appl. No.: 17/651,350

(22) Filed: Feb. 16, 2022

(65) Prior Publication Data
US 2023/0155341 A1     May 18, 2023

Related U.S. Application Data

(60) Provisional application No. 63/264,129, filed on Nov. 16, 2021.

(51) Int. Cl.
*H01S 3/082* (2006.01)
*G01B 11/30* (2006.01)
*H01S 3/108* (2006.01)

(52) U.S. Cl.
CPC ............ *H01S 3/082* (2013.01); *G01B 11/303* (2013.01); *H01S 3/108* (2013.01)

(58) Field of Classification Search
CPC ...... H01S 3/082; H01S 3/108; H01S 3/10061; H01S 3/0092; H01S 3/08059; H01S 3/1123; H01S 5/028; H01S 5/068; G01B 11/303

USPC ......................................................... 356/601
See application file for complete search history.

(56) References Cited

U.S. PATENT DOCUMENTS

| | | | |
|---|---|---|---|
| 6,400,495 | B1 | 6/2002 | Zayhowski |
| 7,408,972 | B2 | 8/2008 | Schmid et al. |
| 2003/0002544 | A1 | 1/2003 | Peterson |
| 2007/0286248 | A1 | 12/2007 | Lee |

(Continued)

FOREIGN PATENT DOCUMENTS

| | | |
|---|---|---|
| CN | 112787208 A | 5/2021 |
| JP | H0943650 A | 2/1997 |

(Continued)

*Primary Examiner* — Md M Rahman
(74) *Attorney, Agent, or Firm* — Harrity & Harrity, LLP

(57) ABSTRACT

Some implementations described herein provide a laser device. The laser device includes a first portion of the laser device, at a proximal end of the laser device, that includes one or more optical devices, where the first portion is configured to emit first electromagnetic waves having a first wavelength. The laser device includes a second portion of the laser device, at a distal end of the laser device, that includes an optical crystal configured to receive the first electromagnetic waves and to emit second electromagnetic waves having a second wavelength based on reception of the first electromagnetic waves, where the optical crystal includes a thin film coating disposed on an end of the optical crystal, the thin film coating configured to: support emission of the second electromagnetic waves from the optical crystal, and support internal reflection of the first electromagnetic waves within the optical crystal.

20 Claims, 8 Drawing Sheets

(56) References Cited

U.S. PATENT DOCUMENTS

| | | |
|---|---|---|
| 2011/0134945 A1 | 6/2011 | Vidne et al. |
| 2016/0003781 A1 | 1/2016 | Ichihara et al. |
| 2020/0049996 A1* | 2/2020 | Yan .................... G02B 27/0172 |

FOREIGN PATENT DOCUMENTS

| | | | |
|---|---|---|---|
| JP | 2007012981 A | | 1/2007 |
| JP | 2014081345 A | * | 5/2014 |
| JP | 2016015440 A | | 1/2016 |
| KR | 20070118467 A | | 12/2007 |
| KR | 101186927 B1 | | 9/2012 |

* cited by examiner

LASER DEVICE AND METHOD OF USING THE SAME

CROSS-REFERENCE TO RELATED APPLICATION

This patent application claims priority to U.S. Provisional patent Application No. 63/264,129, filed on Nov. 16, 2021, and entitled "LASER DEVICE AND METHOD OF USING THE SAME." The disclosure of the prior application is considered part of and is incorporated by reference into this patent application.

BACKGROUND

A laser device (a light amplification by stimulated emission of radiation device) is a device that emits light using optical amplification based on receiving an input (e.g., stimulation). Laser devices may be configured to emit coherent electromagnetic waves (e.g., light waves), which may be focused into a beam (e.g., a transmission path). Laser devices may be used to emit electromagnetic waves for applications such as laser cutting, medical treatments, measurement tools, annealing operations, and/or lithography (e.g., photolithography), among other examples.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
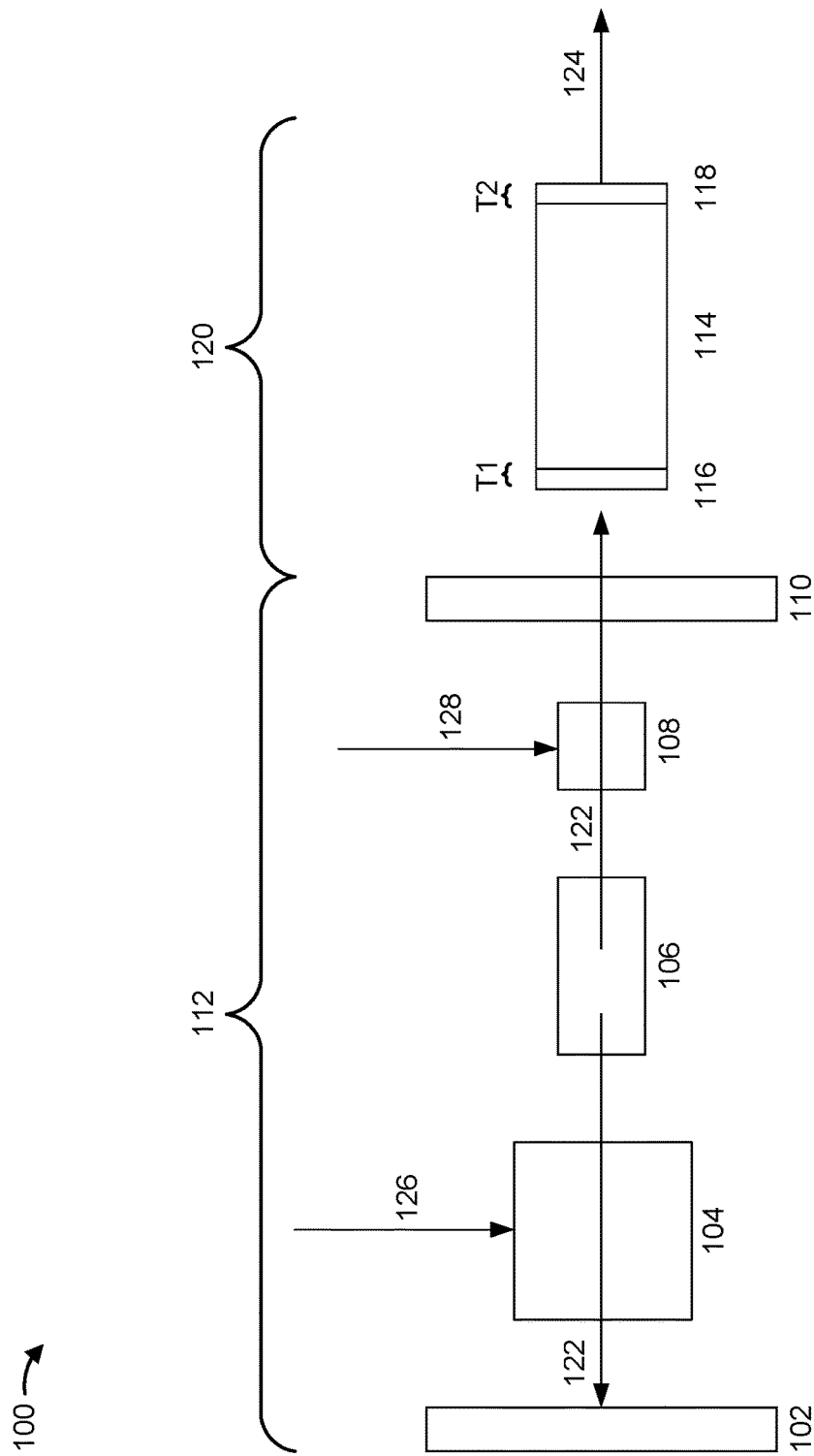
FIGS. 1-3 are diagrams of example of laser devices described herein.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some cases, a laser device may be configured with an optical crystal (nonlinear optical crystal) disposed between optical components of the laser device. The optical crystal may be configured to receive first electromagnetic waves having a first wavelength and emit second electromagnetic waves having a second wavelength. The optical crystal may be disposed between a first mirror device and a second mirror device, with the first mirror device having a first thin film coating on a surface proximate to the optical crystal and with the second mirror device having a second thin film coating on a surface proximate to the optical crystal. The first thin film coating may be configured to reflect the second electromagnetic waves (e.g., to reflect backwards-emitted second electromagnetic waves toward a forward direction). The second thin film coating may be configured to pass forward-emitted second electromagnetic waves through the second mirror device and to reflect forward-emitted first electromagnetic waves back toward the optical crystal for an opportunity to stimulate emission of additional second electromagnetic waves.

Using a laser device configured with the optical crystal disposed between the first mirror device and the second mirror device may provide manufacturing challenges, may provide energy losses, and/or may have an unnecessarily long length. For example, disposing the first thin film coating and the second thin film coating may provide manufacturing challenges. The first thin film coating and the second thin film coating have a low tolerance for deposition errors because the first thin film coating and the second thin film coating are configured to reflect and/or pass electromagnetic waves based on having thicknesses tuned to the first wavelength and/or the second wavelength. Imprecision in thicknesses may cause errors in electromagnetic waves passed or reflected by the first thin film coating or the second thin film coating. In this way, errors in the first thin film coating or the second thin film coating may cause electromagnetic waves with unintended wavelengths to be emitted from the laser device, which may damage a device targeted by the laser device, such as a substrate of a semiconductor device. Additionally, or alternatively the first thin film coating and the second thin film coating may have a low tolerance for roughness, which may scatter electromagnetic waves. Further, based on spaces between the optical crystal and the first mirror device and the second mirror device, the laser device may lose energy (e.g., from scattering in the laser device and/or from colliding with particles, among other examples). Still further, the laser device may have an unnecessarily long cavity, which may be an inefficient use of space in a facility that uses the laser device (e.g., a semiconductor manufacturing facility). In this way, the laser device may consume an unnecessarily high amount of energy to compensate for energy losses, the facility may use resources to reduce energy losses (e.g., soaking the laser device with nitrogen gas to reduce particles between the optical crystal and the first mirror device and the second mirror device, among other examples), and/or manufacturing resources may be unnecessarily consumed based on errors in the first thin film coating or the second thin film coating.

Some implementations described herein provide techniques and apparatuses for using an optical crystal as a resonator for a laser device. In some implementations, the optical crystal may be configured with one or more thin film coatings at one or more ends of the optical crystal (e.g., a backwards end and/or a forward end along a transmission path of the laser device). In this way, the optical crystal may be configured to reflect backwards-traveling second electromagnetic waves toward a forward direction (e.g., via internal reflection at a back end of the optical crystal) and to emit forwards-traveling second electromagnetic waves (e.g., traveling within the optical crystal) from a forward end of the optical crystal. In some implementations, the optical crystal may be configured to reflect forwards-traveling first electromagnetic waves (e.g., traveling within the optical crystal) and to reflect backwards-traveling first electromagnetic waves (e.g., traveling within the optical crystal). In this way, mirror devices having thin film coatings surrounding the optical crystal may be unnecessary. This may allow a manufacturing process for the laser device to avoid unnecessary cost and consumption of resources to provide the mirror devices having thin film coatings. Additionally, the first electromagnetic waves and the second electromagnetic waves may reduce a distance traveled between devices (e.g., between the optical crystal and mirror devices having the thin film coatings), which may reduce energy losses (e.g., by 10%-20% in deep ultraviolet frequencies or by 5%-10% for visible light frequencies, among other examples) from colliding with particles and/or may reduce scattering from thin film coating roughness. In this way, the laser device may have improved energy efficiency and/or reduced manufacturing cost and/or time, among other examples. For example, he laser device may have reduced downtime (e.g., by 2-3%) based on reduced demands of depositing thin film coatings. Additionally, or alternatively, the laser device may have a reduced cavity length (e.g., a 20% reduction), which may conserve space within a tool that includes the laser device.

FIG. 1 is a diagram of an example of a laser device 100 described herein. The laser device 100 may include additional elements (e.g., optical elements) not shown, a housing to position elements within the laser device 100, and/or may be connected to one or more additional devices, such as a controller, a power supply, a time modulator and a spatial modulator (e.g., to control a laser output sequence and a beam shape), an optical filter and grating (e.g., to narrow a laser spectrum), a and/or an input device, among other examples. In some implementations, the housing may include a metal shell and/or a heat sink to reduce thermal loading of the laser device 100. In some implementations, the laser device 100 may be configured with a temperature control to maintain a threshold temperature of one or more optical crystals of the laser device 100. In some implementations, the laser device 100 may be configured for metrology, extreme ultraviolet lithography, immersion scanning, laser annealing, and/or a light source, among other examples.

As shown in FIG. 1 the laser device 100 may include a mirror device 102 disposed at a backward end of a cavity of the laser device 100. The mirror device 102 may be configured to reflect electromagnetic waves (e.g., pump electromagnetic waves) that travel in a backward direction from a gain device 104 and/or from an optical crystal 106 (e.g., a nonlinear optical crystal). The mirror device 102 may be configured to reflect electromagnetic waves having wavelengths associated with the gain device 104 and/or the optical crystal 106.

The gain device 104 may be configured with a population inversion in which electronic and/or molecular energy levels of the gain device 104 are elevated such that a drop in energy levels produce gain device electromagnetic waves within the laser device 100. The gain device 104 may include a crystal-based material, such as a rare-earth ion, a transition metal ion, yttrium aluminum garnet, yttrium orthovanadate, sapphire, and/or cesium cadmium bromide. The gain device 104 may include a glass material (e.g., silicate or phosphate glass doped with laser-active ions), a gas material (e.g., helium and neon, nitrogen, argon, carbon monoxide, carbon dioxide, or a metal vapor, among other examples), a semiconductor material (e.g., gallium arsenide, indium gallium arsenide, and/or gallium nitride, among other examples), and/or liquid material (e.g., a dye solution), among other examples. The gain device may be disposed between the mirror device 102 and the optical crystal 106.

The optical crystal 106 is configured to receive electromagnetic waves having a wavelength (e.g., from the gain device 104) and emit electromagnetic waves having a different wavelength (e.g., a first wavelength of the laser device). The optical crystal 106 may include barium borate, lithium iodate, potassium niobate, monopotassium phosphate, lithium triborate, beta-barium borate, gallium selenide, potassium dihydrogen phosphate, lithium niobate, ammonium dihydrogen phosphate, and/or potassium titanyl phosphate, among other examples.

The laser device 100 may include a modulator device 108 configured to modulate the electromagnetic waves emitted from the optical crystal 106 before passing the electromagnetic waves to a mirror device 110. The mirror device 110 and the mirror device 102 may be linearly spaced from the optical crystal 106 such that the electromagnetic waves emitted from the optical crustal 106 may travel through a vacuum or other gas before interacting with the mirror device 110 or the mirror device 102. The modulator device 108 may be configured to block transmission of the electromagnetic waves to the mirror device 110 during a timing interval such that the modulator device 108 passes the electromagnetic waves to the mirror device 110 in pulses. For example, the modulator device 108 may allow transmission of the electromagnetic waves during first portions of time and may block transmission of the electromagnetic waves during second portions of time that alternate with the first portions of time. In some implementations, the electromagnetic waves may reflect between the modulator device 108 and one or more of the mirror 102 or the optical crystal 106 when the modulator device 108 blocks the electromagnetic waves, such that during the first portions of time, an increased volume of electromagnetic waves pass through the modulator device 108.

The mirror device 110 may be configured to reflect a high proportion (e.g., approximately 98% and/or an amount greater than or equal to 90%) of electromagnetic waves outside of a configured range of wavelengths (e.g., a wavelength associated with the electromagnetic waves emitted by the optical crystal 106) and to pass a high proportion (e.g., approximately 98% and/or an amount greater than or equal to 90%) of electromagnetic waves in the configured range of wavelengths. For example, the mirror device 110 may be configured with a thickness and/or material that couples to the configured range of wavelengths. In this way, the mirror device 110 may reduce an amount of electromagnetic waves, that are not configured to stimulate emission of electromagnetic waves having a desired wavelength, from exiting a first portion 112 of the laser device 100.

In some implementations, the first portion 112 of the laser device 100 may include multiple optical crystals that receive electromagnetic waves of an incoming frequency and generate electromagnetic waves of an outgoing frequency. For example, a first optical crystal may receive electromagnetic waves having a first frequency and may generate electromagnetic waves having a second frequency. A second optical crystal may receive the electromagnetic waves having the second frequency and may generate electromagnetic waves having a third frequency. A third optical crystal may receive the electromagnetic waves having the third frequency and may generate electromagnetic waves having a fourth frequency. In this way, the first portion 112 of the laser device 100 may have any number of optical crystals to convert incoming electromagnetic waves having a first frequency into outgoing waves having a second frequency.

After the first portion 112 of the laser device 100 along a transmission path, the laser device 100 may include an optical crystal 114 configured to receive electromagnetic waves emitted by the optical crystal 106 and to emit electromagnetic waves, having a different wavelength, along the transmission path away from the first portion 112. In some implementations, the electromagnetic waves emitted by the optical crystal 114 may be harmonics of the electromagnetic waves received from the optical crystal 106.

The optical crystal 114 may include a thin film coating 116 on an end of the optical crystal 114 that is proximate to the first portion 112 (e.g., a backward end). The thin film coating 116 may be configured to receive the electromagnetic waves emitted from the optical crystal 106 and to reflect electromagnetic waves (e.g., with a 90% reflection) generated by the optical crystal 114 (e.g., based on receiving the electromagnetic waves emitted from the optical crystal 106). For example, the thin film coating 116 may be configured with a thickness and/or material to couple the thin film coating 116 to the electromagnetic waves emitted from the optical crystal 106 so the electromagnetic waves from the optical crystal 106 pass through the thin film coating 116.

In some implementations, the thin film coating 116 may be further configured to internally reflect the electromagnetic waves emitted from the optical crystal 106 (first electromagnetic waves) and/or to internally reflect the electromagnetic waves generated by the optical crystal 114 (second electromagnetic waves) based on the first electromagnetic waves and/or the second electromagnetic waves traveling within the optical crystal 114 in a backward direction. In some implementations, the thin film coating 116 is configured to support internal reflection of the electromagnetic waves generated by the optical crystal 114 (second electromagnetic waves) and to support internal reflection of the electromagnetic waves emitted by the optical crystal 106 based on a wavelength of the first electromagnetic waves, based on a wavelength of the second electromagnetic waves, based on a material of the thin film coating 116 (e.g., a refractive index of the material), and/or based on a thickness T1 of the thin film coating 116.

The optical crystal 114 may include a thin film coating 118 on an end of the optical crystal 114 that is distal from the first portion 112 (e.g., a forward end). The thin film coating 118 may be configured to emit the electromagnetic waves generated by the optical crystal 114 and/or may be configured to reflect electromagnetic waves emitted from the optical crystal 106.

In some implementations, the thin film coating 118 may be further configured to emit the electromagnetic waves emitted from the optical crystal 114 and/or to internally reflect the electromagnetic waves emitted from the optical crystal 106 based on the first electromagnetic waves and the second electromagnetic waves traveling within the optical crystal 114 in a forward direction. In some implementations, the thin film coating 118 is configured to support emission of the electromagnetic waves emitted from the optical crystal 114 and to support internal reflection of the electromagnetic waves emitted from the optical crystal 106 based on a wavelength of the first electromagnetic waves, based on a wavelength of the second electromagnetic waves, based on a material of the thin film coating 118 (e.g., a refractive index), and/or based on a thickness T2 of the thin film coating 118.

In some implementations, the thin film coating 116 may have material and/or thickness such as a metal (e.g., aluminum, silver, gold, among other examples) or a dielectric (e.g., $SiO_2$, $MgF_2$, $YF_3$, $LaF_3$, $Al_2O_3$, $CeF_3$, $Y_2O_3$, $HfO_2$, $TiO_2$, $CeF_3$, $YF_3$, ZnS, ZnO, ZnSe, $LaTiO_3$, $ZrO_2$, among other examples) that are configured for anti-reflection of electromagnetic waves emitted by the optical crystal 106 and for high reflection of electromagnetic waves emitted by the optical crystal 114 to form a resonator. In some implementations, a thickness of the thin film coating 116 may be less than 1 micrometer. The thin film coating 116 may have a refractive index in a range of approximately 1.2 to approximately 2.7. The optical crystal 114 may have a refractive index in a range of approximately 1.4 to approximately 1.7.

The multi-film coating (e.g., the thin film coating 116 and the thin film coating 118) may achieve anti-reflection or high reflection based on interference. For example, the thin film coatings 116 and 118 may be configured to cause destructive interference for electromagnetic waves emitted by the optical crystal 106 and constructive interference for electromagnetic waves emitted by the optical crystal 114. Therefore, the thin film coating 116 and the thin film coating 118 may be formed with a thickness and refractive index to fine-tune a reflection spectrum.

The optical crystal 114 with the thin film coating 116 and the thin film coating 118 may be part of a second portion 120 of the laser device 100. The second portion 120 is further along the transmission path of the laser device 100 than the first portion 112. In some implementations, the second portion 120 of the laser device 100 may include multiple optical crystals that receive electromagnetic waves of an incoming frequency and generate electromagnetic waves of an outgoing frequency. For example, a first optical crystal may receive electromagnetic waves having a first frequency and may generate electromagnetic waves having a second frequency. A second optical crystal may receive the electromagnetic waves having the second frequency and may generate electromagnetic waves having a third frequency. A third optical crystal may receive the electromagnetic waves having the third frequency and may generate electromagnetic waves having a fourth frequency. In this way, the second portion 120 of the laser device 100 may have any number of optical crystals to convert incoming electromagnetic waves having a first frequency into outgoing waves having a second frequency.

In an example operation of the laser device 100, the optical crystal 106 may emit first electromagnetic waves 122. The first electromagnetic waves 122 may travel in a forward direction, towards the second portion 120 of the laser device 100 (e.g., towards the optical crystal 114). In some implementations, a portion of the first electromagnetic waves 122 may travel in a backwards direction and may be reflected by the mirror device 102 such that the portion of the first electromagnetic waves 122 travel in the forward direction.

The optical crystal 114 receives the first electromagnetic waves 122 via the thin film coating 116 and emits the second electromagnetic waves 124 based on receiving the first electromagnetic waves 122. In some implementations, the first electromagnetic waves 122 may enter the optical crystal 114 and stimulate generation of the second electromagnetic waves 124 within the optical crystal 114. In some implementations, a portion of the first electromagnetic waves 122 within the optical crystal 114 may travel across the optical crystal 114 and may be internally reflected by the thin film coating 118 such that the portion of the first electromagnetic waves 122 travel back across the optical crystal 114 with an additional opportunity to stimulate generation of the second electromagnetic waves 124. In this way, the optical crystal 114 may use stimulation from the first electromagnetic waves to generate and emit the second electromagnetic waves 124 with a reduced amount of traveling of the first electromagnetic waves 122 and the second electromagnetic waves 124 outside of the optical crystal 114 during stimulation.

In some implementations, the gain device 104 receives an input signal 126 to configure the population inversion for the gain device 104. In some implementations, the input signal 126 may include electrical signals configured for electron excitement within the gain device 104. The electron excitement within the gain device 104 may cause the gain device 104 to emit electromagnetic waves that cause electron excitement within the optical crystal 106 and/or stimulate emission of the first electromagnetic waves 122 shown in FIG. 1. In some implementations, the modulator device 108 receives a control signal 128 to cause the modulator device 108 to form pulses of the first electromagnetic waves 122 before providing the first electromagnetic waves 122 to the second portion 120.

Figure 2:
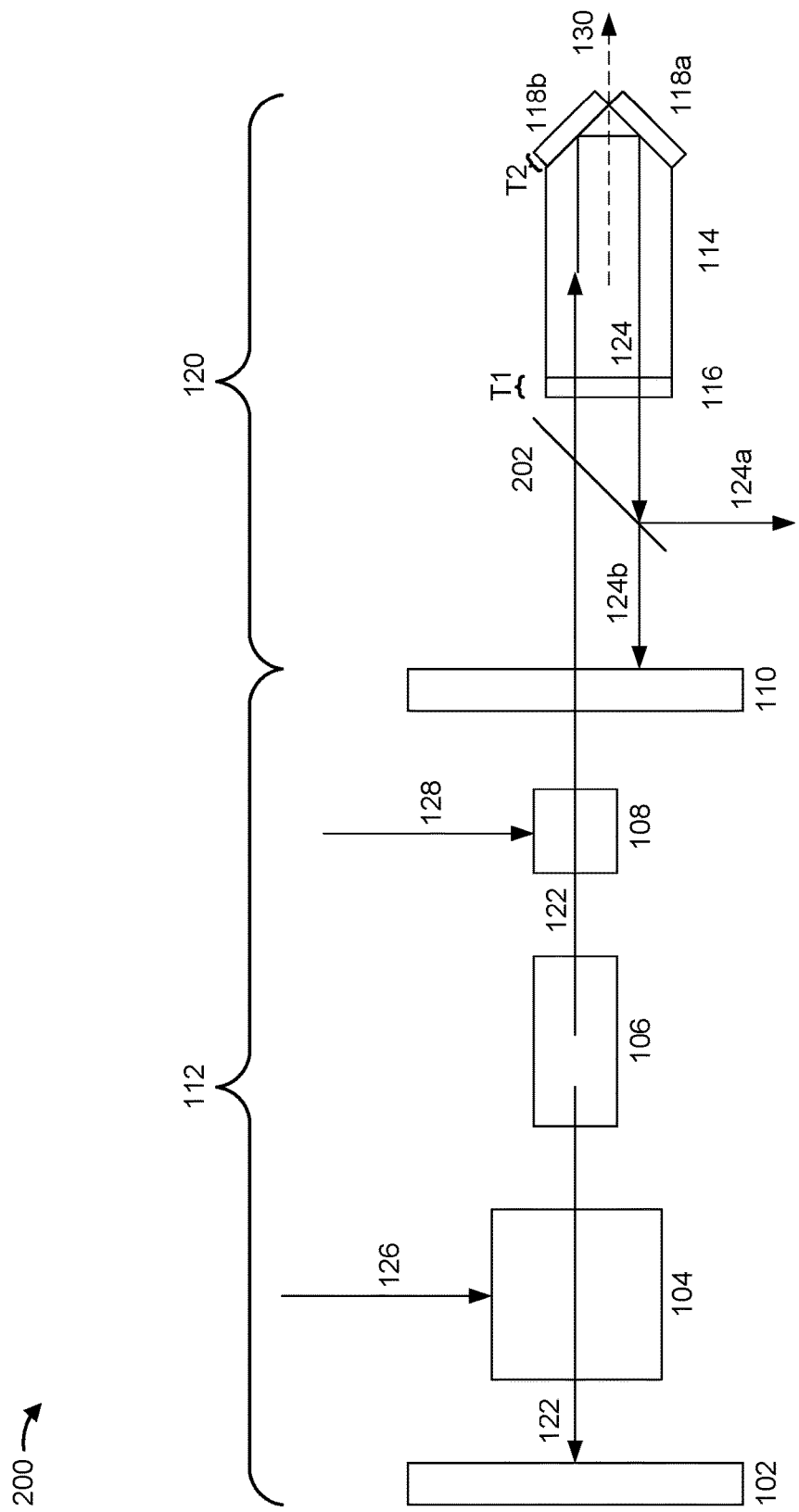

FIG. 2 is a diagram of an example of a laser device 200 described herein. The laser device 200 shown in FIG. 2 may include, or may be included in, a laser device 100. The laser device 200 may include additional elements (e.g., optical elements) not shown, a housing to position elements within the laser device 200, and/or may be connected to one or more additional devices, such as a controller and/or an input device, among other examples. Devices and other elements of the laser device 200 may have features, configurations, and/or materials corresponding to devices or other elements of the laser device 100.

As shown in FIG. 2 the laser device 200 may include a mirror device 102 disposed at a backward end of a cavity of the laser device 200. The mirror device 102 may be configured to reflect electromagnetic waves (e.g., pump electromagnetic waves) that travel in a backward direction from a gain device 104 and/or from an optical crystal 106 (e.g., a nonlinear optical crystal). The mirror device 102 may be configured to reflect electromagnetic waves having wavelengths associated with the gain device 104 and/or the optical crystal 106.

The gain device 104 may be configured with a population inversion in which electronic and/or molecular energy levels of the gain device 104 are elevated such that a drop in energy levels produce gain device electromagnetic waves within the laser device 200. The gain device 104 may include a crystal-based material, such as a rare-earth ion, a transition metal ion, yttrium aluminum garnet, yttrium orthovanadate, sapphire, and/or cesium cadmium bromide. The gain device 104 may include a glass material (e.g., silicate or phosphate glass doped with laser-active ions), a gas material (e.g., helium and neon, nitrogen, argon, carbon monoxide, carbon dioxide, or a metal vapor, among other examples), a semiconductor material (e.g., gallium arsenide, indium gallium arsenide, and/or gallium nitride, among other examples), and/or liquid material (e.g., a dye solution), among other examples. The gain device may be disposed between the mirror device 102 and the optical crystal 106.

The optical crystal 106 is configured to receive electromagnetic waves having a wavelength (e.g., from the gain device 104) and emit electromagnetic waves having a different wavelength (e.g., a first wavelength of the laser device). The optical crystal 106 may include barium borate, lithium iodate, potassium niobate, monopotassium phosphate, lithium triborate, beta-barium borate, gallium selenide, potassium dihydrogen phosphate, lithium niobate, ammonium dihydrogen phosphate, and/or potassium titanyl phosphate, among other examples.

The laser device 200 may include a modulator device 108 configured modulate the electromagnetic waves emitted from the optical crystal before passing the electromagnetic waves to a mirror device 110. The modulator device 108 may be configured to block transmission of the electromagnetic waves to the mirror device 110 during a timing interval such that the modulator device 108 passes the electromagnetic waves to the mirror device 110 in pulses.

The mirror device 110 may be configured to reflect a high proportion (e.g., approximately 98% and/or an amount greater than or equal to 90%) of electromagnetic waves outside of a configured range of wavelengths (e.g., a wavelength associated with the electromagnetic waves emitted by the optical crystal 106) and to pass a high proportion (e.g., approximately 98% and/or an amount greater than or equal to 90%) of electromagnetic waves in the configured range of wavelengths. In this way, the mirror device 110 may reduce an amount of electromagnetic waves, that are not configured to stimulate emission of electromagnetic waves having a desired wavelength, from exiting a first portion 112 of the laser device 200.

After the first portion 112 of the laser device 200 along a transmission path, the laser device 200 may include an optical crystal 114 configured to receive electromagnetic waves emitted by the optical crystal 106 and to emit electromagnetic waves, having a different wavelength. The optical crystal 114 may include a thin film coating 116 on an end of the optical crystal 114 that is proximate to the first portion 112 (e.g., a backward end). The thin film coating 116 may be configured to receive the electromagnetic waves emitted from the optical crystal 106 when received via the first portion 112 and to reflect the electromagnetic waves generated by the optical crystal 106 when traveling within the optical crystal 114. The thin film coating 116 may also be configured to pass the electromagnetic waves generated by the optical crystal 114 (e.g., based on receiving the electromagnetic waves emitted from the optical crystal 106).

The optical crystal 114 may include a thin film coating 118 on an end of the optical crystal 114 that is distal from the first portion 112 (e.g., a forward end). The thin film coating 118 may be configured to reflect the electromagnetic waves generated by the optical crystal 114 and/or emitted from the optical crystal 106. In some implementations, the thin film coating 118 has a manufacturing tolerance (e.g., for thickness and/or roughness) that is greater than a manufacturing tolerance for the thin film coating 116.

In some implementations, the thin film coating 118 includes two or more angled surfaces that may (e.g., optionally) have reflective films 118a and 118b disposed thereon.

The two or more angled surfaces may be formed with angles that are symmetric about a logical axis 130 that is parallel to a transmission path in a direction from the first portion 112 to the second portion 120 of the laser device. In some implementations, the two or more angled surfaces may be angled, relative to a transmission path within the optical crystal 114, such that the first electromagnetic waves will internally refract. The total internal reflection angle of nonlinear optical crystal may be in a range of approximately 40 to approximately 70 degrees. Therefore, the distal end of crystal can achieve total internal reflection so long as the angle is greater than 70 degrees. In this way, the optical crystal 114 may not need the thin film coating 118, which may be omitted.

In some implementations, the laser device 200 further includes a beam splitter 202 disposed along a transmission path after emission of the second electromagnetic waves via the optical crystal 114. In some implementations, the beam splitter 202 may be configured to split the second electromagnetic waves based on reflecting (e.g., in a different direction than a transmission path between the optical crystal 106 to the optical crystal 114) a portion 124a of the second electromagnetic waves and passing a portion 124b of the second electromagnetic waves.

The beam splitter 202 and the optical crystal 114 with the thin film coating 116 and the thin film coating 118 may be part of a second portion 120 of the laser device 200. The second portion 120 is further along the transmission path of the laser device 200 than the first portion 112.

In an example operation of the laser device 200, the optical crystal 106 may emit the first electromagnetic waves 122. The first electromagnetic waves 122 may travel in a forward direction, towards the second portion 120 of the laser device 200 (e.g., towards the optical crystal 114). In some implementations, a portion of the first electromagnetic waves 122 may travel in a backwards direction and may be reflected by the mirror device 102 such that the portion of the first electromagnetic waves 122 travel in the forward direction.

The optical crystal 114 receives the first electromagnetic waves 122, which may previously travel through the beam splitter 202, via the thin film coating 116 and emits the second electromagnetic waves 124 based on receiving the first electromagnetic waves 122. The second electromagnetic waves 124 and/or the first electromagnetic waves 122 (collectively, the electromagnetic waves) may reflect off the two or more angled surfaces having reflective films 118a and 118b disposed thereon. Based on the two or more angled surfaces being formed with angles that are symmetric about the logical axis 130, the electromagnetic waves may be reflected such that the electromagnetic waves travel in a direction that is opposite a direction that the electromagnetic waves travel before reflecting off the two or more angled surfaces.

The second electromagnetic waves 124 may exit the optical crystal 114 based on selection by the thin film coating 116 and the first electromagnetic waves 122 may be internally reflected by the thin film coating 116. The second electromagnetic waves 124 may be split using the beam splitter 202 after emission by the optical crystal 114. The portion 124a may be reflected by the beam splitter 202 to a direction that is different from a transmission direction of the laser device 200.

In some implementations, the first electromagnetic waves 122 may enter the optical crystal 114 and stimulate generation of the second electromagnetic waves 124 within the optical crystal 114. In some implementations, a portion of the first electromagnetic waves 122 within the optical crystal 114 may travel across the optical crystal 114, off the thin film coating 118, and then may be internally reflected by the thin film coating 116 such that the portion of the first electromagnetic waves 122 travel back across the optical crystal 114 with an additional opportunity to stimulate generation of the second electromagnetic waves 124. In this way, the optical crystal 114 may use stimulation from the first electromagnetic waves to generate and emit the second electromagnetic waves 124 with a reduced amount of traveling of the first electromagnetic waves 122 and the second electromagnetic waves 124 outside of the optical crystal 114 during stimulation. Additionally, or alternatively, the optical crystal 114 may have an effective length (e.g., associated with an amount of the second electromagnetic waves expected to be emitted) that is greater than an actual length of the optical crystal 114. For example, the effective length maybe approximately double the actual length.

In some implementations, the gain device 104 receives an input signal 126 to configure the population inversion for the gain device 104. In some implementations, the input signal 126 may include electrical signals configured to electron excitement within the gain device 104. The electron excitement within the gain device 104 may cause the gain device 104 to emit electromagnetic waves that cause electron excitement within the optical crystal 106 and/or stimulate emission of the first electromagnetic waves 122 shown in FIG. 2. In some implementations, the modulator device 108 receives a control signal 128 to cause the modulator device 108 to form pulses of the first electromagnetic waves 122 before providing the first electromagnetic waves 122 to the second portion 120.

Figure 3:
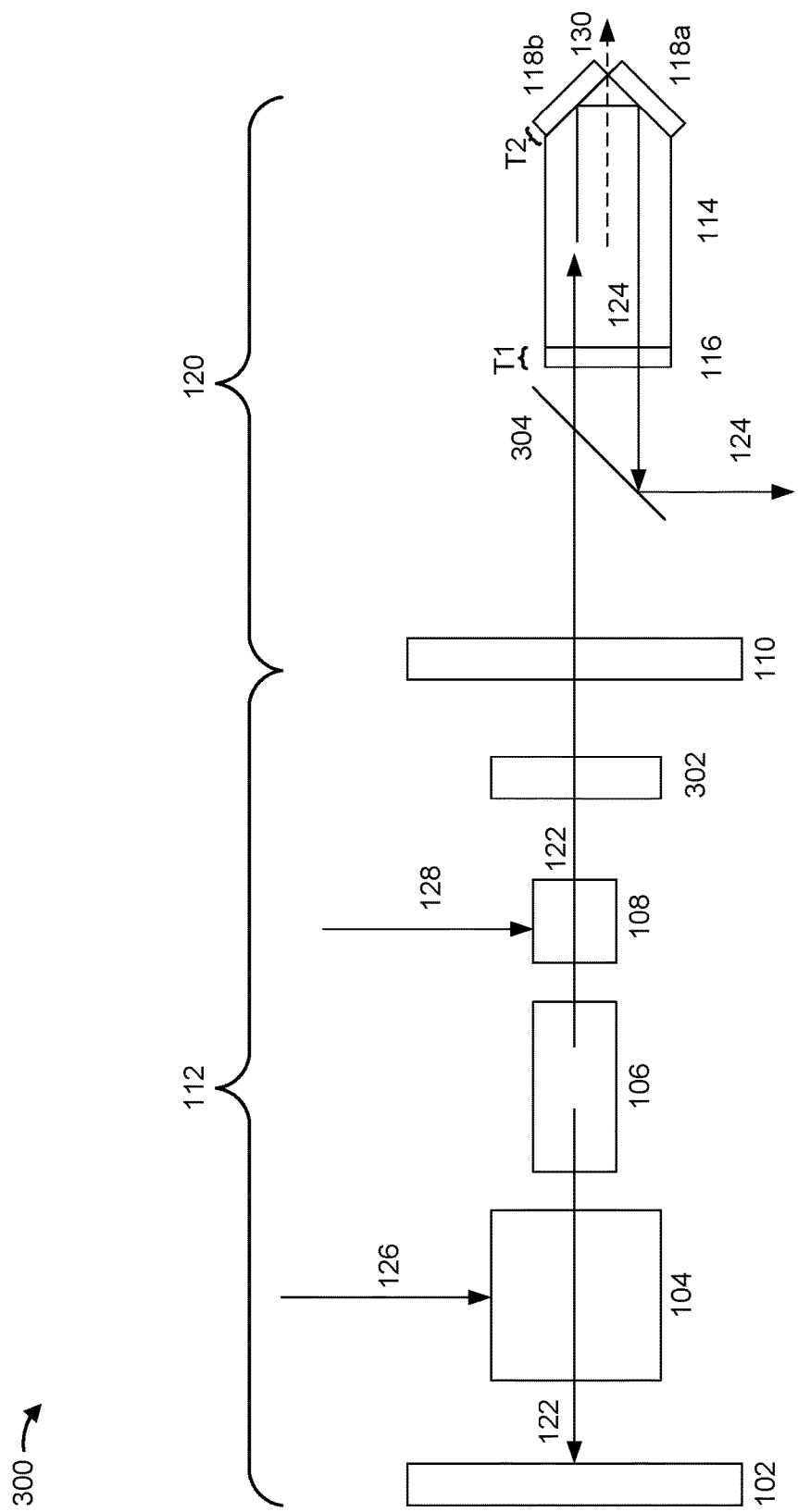

FIG. 3 is a diagram of an example of a laser device 300 described herein. The laser device 300 shown in FIG. 3 may include, or may be included in a laser device 100. The laser device 300 may include additional elements (e.g., optical elements) not shown, a housing to position elements within the laser device 300, and/or may be connected to one or more additional devices, such as a controller and/or an input device, among other examples.

As shown in FIG. 3 the laser device 300 may include a mirror device 102 disposed at a backward end of a cavity of the laser device 300. The mirror device 102 may be configured to reflect electromagnetic waves (e.g., pump electromagnetic waves) that travel in a backward direction from a gain device 104 and/or from an optical crystal 106 (e.g., a nonlinear optical crystal). The mirror device 102 may be configured to reflect electromagnetic waves having wavelengths associated with the gain device 104 and/or the optical crystal 106.

The gain device 104 may be configured with a population inversion in which electronic and/or molecular energy levels of the gain device 104 are elevated such that a drop in energy levels produce gain device electromagnetic waves within the laser device 300. The gain device 104 may include a crystal-based material, such as a rare-earth ion, a transition metal ion, yttrium aluminum garnet, yttrium orthovanadate, sapphire, and/or cesium cadmium bromide. The gain device 104 may include a glass material (e.g., silicate or phosphate glass doped with laser-active ions), a gas material (e.g., helium and neon, nitrogen, argon, carbon monoxide, carbon dioxide, or a metal vapor, among other examples), a semiconductor material (e.g., gallium arsenide, indium gallium arsenide, and/or gallium nitride, among other examples), and/or liquid material (e.g., a dye solution), among other examples. The gain device may be disposed between the mirror device 102 and the optical crystal 106.

The optical crystal 106 is configured to receive electromagnetic waves having a wavelength (e.g., from the gain device 104) and emit electromagnetic waves having a different wavelength (e.g., a first wavelength of the laser device). The optical crystal 106 may include barium borate, lithium iodate, potassium niobate, monopotassium phosphate, lithium triborate, beta-barium borate, gallium selenide, potassium dihydrogen phosphate, lithium niobate, ammonium dihydrogen phosphate, and/or potassium titanyl phosphate, among other examples.

The laser device 300 may include a modulator device 108 configured modulate the electromagnetic waves emitted from the optical crystal before passing the electromagnetic waves to a mirror device 110. The modulator device 108 may be configured to block transmission of the electromagnetic waves to the mirror device 110 during timing interval such that the modulator device 108 passes the electromagnetic waves to the mirror device 110 in pulses.

As shown in FIG. 3, a polarizer device 302 may be disposed between the modulator device 108 and the mirror device 110. In this way, the laser device 300 may be configured to polarize the electromagnetic waves emitted by the optical crystal 106 before providing the electromagnetic waves to the optical crystal 114. Devices and other elements of the laser device 300 may have features, configurations, and/or materials corresponding to devices or other elements of the laser device 100 and/or the laser device 200.

The mirror device 110 may be configured to reflect a high proportion (e.g., approximately 98% and/or an amount greater than or equal to 90%) of electromagnetic waves outside of a configured range of wavelengths (e.g., a wavelength associated with the electromagnetic waves emitted by the optical crystal 106) and to pass a high proportion (e.g., approximately 98% and/or an amount greater than or equal to 90%) of electromagnetic waves in the configured range of wavelengths. In this way, the mirror device 110 may reduce an amount of electromagnetic waves, that are not configured to stimulate emission of electromagnetic waves having a desired wavelength, from exiting a first portion 112 of the laser device 300.

After the first portion 112 of the laser device 300 along a transmission path, the laser device 300 may include an optical crystal 114 configured to receive electromagnetic waves emitted by the optical crystal 106 and to emit electromagnetic waves, having a different wavelength. The optical crystal 114 may include a thin film coating 116 on an end of the optical crystal 114 that is proximate to the first portion 112 (e.g., a backward end). The thin film coating 116 may be configured to receive the electromagnetic waves emitted from the optical crystal 106 when received via the first portion 112 and to reflect the electromagnetic waves generated by the optical crystal 106 when traveling within the optical crystal 114. The thin film coating 116 may also be configured to pass the electromagnetic waves generated by the optical crystal 114 (e.g., based on receiving the electromagnetic waves emitted from the optical crystal 106).

The optical crystal 114 may include a thin film coating 118 on an end of the optical crystal 114 that is distal from the first portion 112 (e.g., a forward end). The thin film coating 118 may be configured to reflect the electromagnetic waves generated by the optical crystal 114 and/or emitted from the optical crystal 106. In some implementations, the thin film coating 118 has a manufacturing tolerance (e.g., for thickness and/or roughness) that is greater than a manufacturing tolerance for the thin film coating 116.

In some implementations, the thin film coating 118 includes two or more angled surfaces having reflective films 118a and 118b disposed thereon. The two or more angled surfaces may be formed with angles that are symmetric about a logical axis 130 that is parallel to a transmission path in a direction from the first portion 112 to the second portion 120 of the laser device.

In some implementations, the laser device 300 further includes a beam splitter 304 disposed along a transmission path after emission of the second electromagnetic waves via the optical crystal 114. In some implementations, the beam splitter 304 may be configured to reflect the second electromagnetic waves based on the second electromagnetic waves being polarized.

The beam splitter 304 and the optical crystal 114 with the thin film coating 116 and the thin film coating 118 may be part of a portion 120 of the laser device 300. The portion 120 is further along the transmission path of the laser device 300 than the first portion 112.

In an example operation of the laser device 300, the optical crystal 106 may emit the first electromagnetic waves 122. The first electromagnetic waves 122 may travel in a forward direction, towards the second portion 120 of the laser device 300 (e.g., towards the optical crystal 114). In some implementations, a portion of the first electromagnetic waves 122 may travel in a backwards direction and may be reflected by the mirror device 102 such that the portion of the first electromagnetic waves 122 travel in the forward direction.

The optical crystal 114 receives the first electromagnetic waves 122, having a polarization and/or having previously traveled through the beam splitter 304, via the thin film coating 116 and emits the second electromagnetic waves 124 based on receiving the first electromagnetic waves 122. The second electromagnetic waves 124 and/or the first electromagnetic waves 122 (collectively, the electromagnetic waves) may reflect off the two or more angled surfaces having reflective films 118a and 118b disposed thereon. Based on the two or more angled surfaces being formed with angles that are symmetric about the logical axis 130, the electromagnetic waves may be reflected such that the electromagnetic waves travel in a direction that is opposite a direction that the electromagnetic waves travel before reflecting off the two or more angled surfaces.

The second electromagnetic waves 124 may exit the optical crystal 114 based on selection by the thin film coating 116 and the first electromagnetic waves 122 may be internally reflected by the thin film coating 116. The second electromagnetic waves 124 may be reflected using the beam splitter 304 after emission by the optical crystal 114. The second electromagnetic waves 124 may be reflected by the beam splitter 304 to a direction that is different from a transmission direction of the laser device 300. In some implementations, the first electromagnetic waves 124 may be reflected (e.g., with little or no splitting) based on the beam splitter being a polarized beam splitter and based on the second electromagnetic waves 124 being generated with a polarization. The second electromagnetic waves 124 may be generated with a polarization based on the first electromagnetic waves 122 being polarized by the polarizer device 302.

In some implementations, the first electromagnetic waves 122 may enter the optical crystal 114 and stimulate generation of the second electromagnetic waves 124 within the optical crystal 114. In some implementations, a portion of the first electromagnetic waves 122 within the optical crystal 114 may travel across the optical crystal 114, off the thin film coating 118, and then may be internally reflected by the thin film coating 116 such that the portion of the first electromagnetic waves 122 travel back across the optical crystal 114 with an additional opportunity to stimulate generation of the second electromagnetic waves 124. In this way, the optical crystal 114 may use stimulation from the first electromagnetic waves to generate and emit the second electromagnetic waves 124 with a reduced amount of traveling of the first electromagnetic waves 122 and the second electromagnetic waves 124 outside of the optical crystal 114 during stimulation. Additionally, or alternatively, the optical crystal 114 may have an effective length (e.g., associated with an amount of the second electromagnetic waves expected to be emitted) that is greater than an actual length of the optical crystal 114. For example, the effective length maybe approximately double the actual length.

In some implementations, the gain device 104 receives an input signal 126 to configure the population inversion for the gain device 104. In some implementations, the input signal 126 may include electrical signals configured to electron excitement within the gain device 104. The electron excitement within the gain device 104 may cause the gain device 104 to emit electromagnetic waves that cause electron excitement within the optical crystal 106 and/or stimulate emission of the first electromagnetic waves 122 shown in FIG. 3. In some implementations, the modulator device 108 receives a control signal 128 to cause the modulator device 108 to form pulses of the first electromagnetic waves 122 before providing the first electromagnetic waves 122 to the second portion 120.

Figure 4:
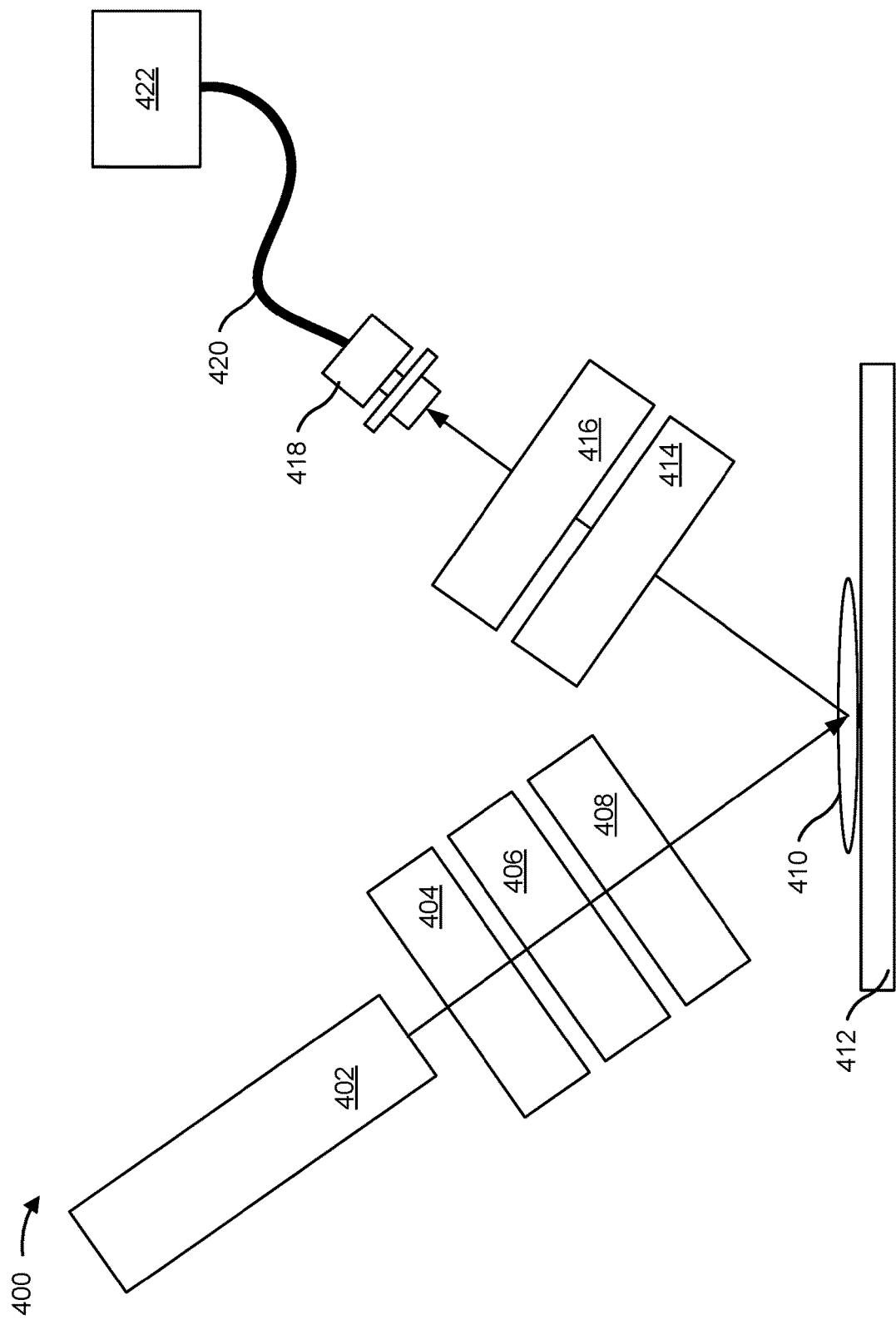
FIG. 4 is a diagram of an example environment in which systems and/or methods described herein may be implemented.

FIG. 4 is a diagram of an example environment in which systems and/or methods described herein may be implemented. FIG. 4 illustrates an example system 400 (e.g., an inspection tool) in which laser device 100, laser device 200, and/or laser device 300 may be used.

As shown in FIG. 4, a laser device 402 (e.g., the laser device 100, the laser device 200, and/or the laser device 300) may emit electromagnetic waves toward an object to be inspected. In some implementations, the laser device 402 may have a length (e.g., in a direction along a path of the electromagnetic waves) that is reduced based on including one or more features described in connection with the laser device 100, the laser device 200, and/or the laser device 300. In some implementations, the laser device 402 may consume a reduced amount of power resources and/or may generate an increased amount of electromagnetic waves based on including one or more features described in connection with the laser device 100, the laser device 200, and/or the laser device 300. In some implementations, the laser device 402 may have a reduced frequency bandwidth of electromagnetic waves based on including one or more features described in connection with the laser device 100, the laser device 200, and/or the laser device 300. In this way, the laser device 402 may produce a set of electromagnetic waves that provide an inspection tool with an improved consistency of results (e.g., based on the electromagnetic waves refracting and/or reflecting off of an object with improved consistency.

The electromagnetic waves may pass through an intensity modulator 404, a filter 406, and/or a polarizer 408. In some implementations, the intensity modulator 404 may control a power of the electromagnetic waves directed toward an object. In some implementations, the filter 406 may filter out frequencies from the electromagnetic waves that are outside of a range of frequencies. For example, the filter 406 may couple to a desired frequency, such that electromagnetic waves at the desired frequency, or within a threshold difference from the desired frequency, pass through the filter 406. The polarizer 408 may polarize the electromagnetic waves such that the electromagnetic waves have a common polarization (e.g., a horizontal polarization or a vertical polarization). In this way, the electromagnetic waves may have an improve consistency in refractions off an object. Additionally, or alternatively, the polarizer 408 may be configured, along with the intensity modulator 404, to reduce a power of the electromagnetic waves to a desired power range.

The electromagnetic waves may be emitted by the laser device 402 and may pass through the intensity modulator 404, the filter 406, and/or the polarizer 408 before interacting with an object 410 under inspection (e.g., placed on an inspection surface 412). The electromagnetic waves may by emitted toward the object such that the electromagnetic waves may reflect and/or refract off of one or more surfaces of the object 410. Based at least in part on reflections and/or refractions off of the one or more surfaces of the object 410, the system may detect features of the object 410, such as a topography of the object 410. In some implementations, the object 410 may be a semiconductor chip after manufacturing (e.g., a device under test), or may be a wafer or semiconductor chip at an intermediate state of a manufacturing process.

After reflecting or refracting off of the one or more surfaces of the object 410, the electromagnetic waves may pass through a compensator 414 and/or an analyzer 416. The compensator 414 and the analyzer 416 may form or include a polarizer compensator sample analyzer that enhances contrast for image inspection and forms an image on a photo-sensitive element of the system. For example, the compensator 414 and the analyzer 416 may enhance reception of the electromagnetic waves to form an image on a detector 418. In some implementations, the image may be a grayscale image with improved resolution and/or contrast based at least in part on the compensator and/or analyzer. The detector 418 may provide, via a communication medium 420, the image or associated information to a data acquisition device 422. The data acquisition device 422 may include a processor, memory, and/or one or more other elements that support analyzing and/or storing images of the object 410 based on reception of the electromagnetic waves emitted by the laser device 402. The data acquisition device 422 may provide the images to another device and/or may report on a status (e.g., passing inspection or failing inspection) associated with the object 410.

Figure 5:
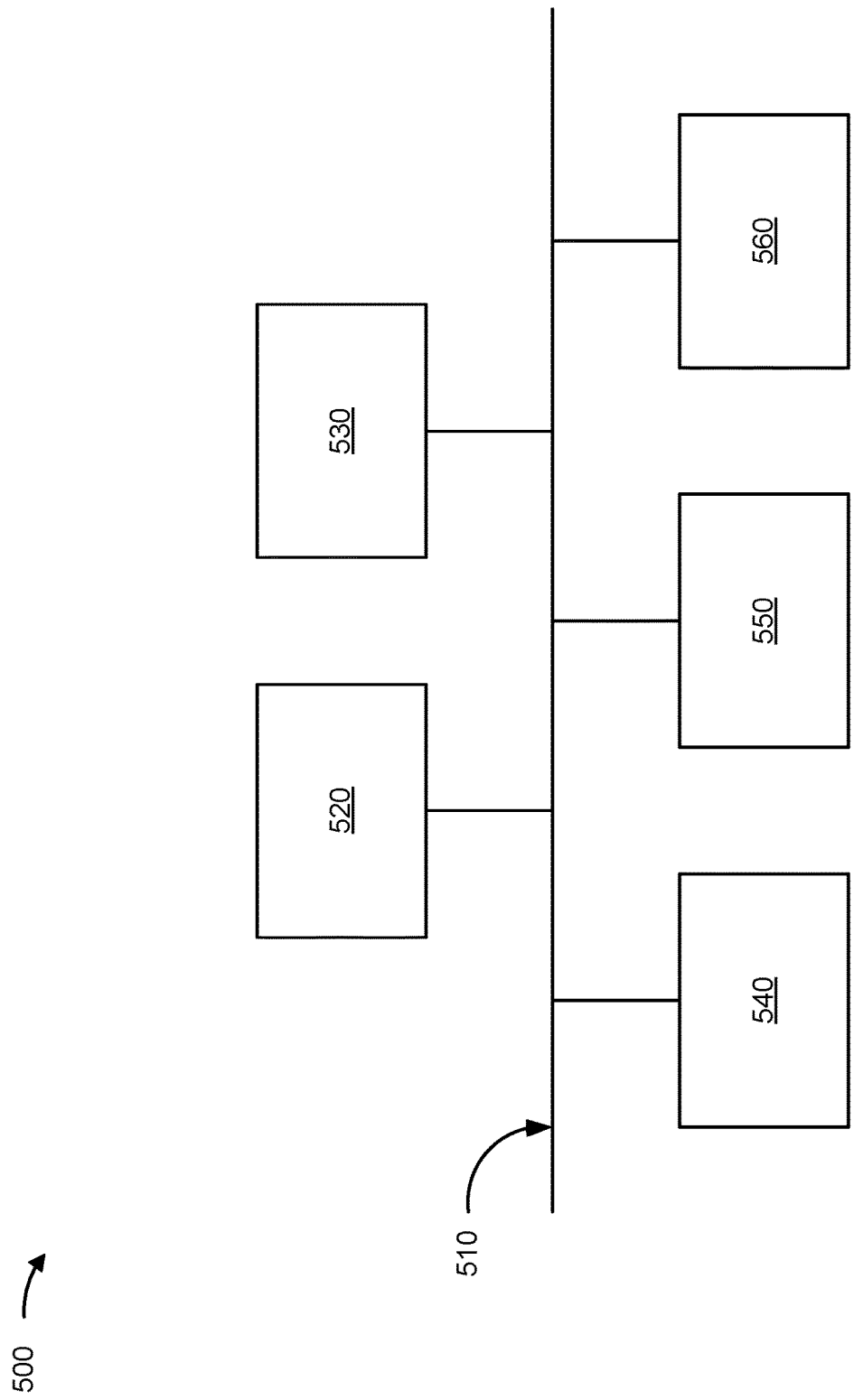
FIG. 5 is a diagram of example components of one or more devices of FIG. 1 described herein.

FIG. 5 is a diagram of example components of a device 500, which may correspond to a controller of the laser device 100, 200, 300, or 402, a controller of the system 400, and/or the data acquisition device 422. In some implementations, controller of the laser device 100, 200, 300, or 402, the controller of the system 400, and/or the data acquisition device 422 may include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
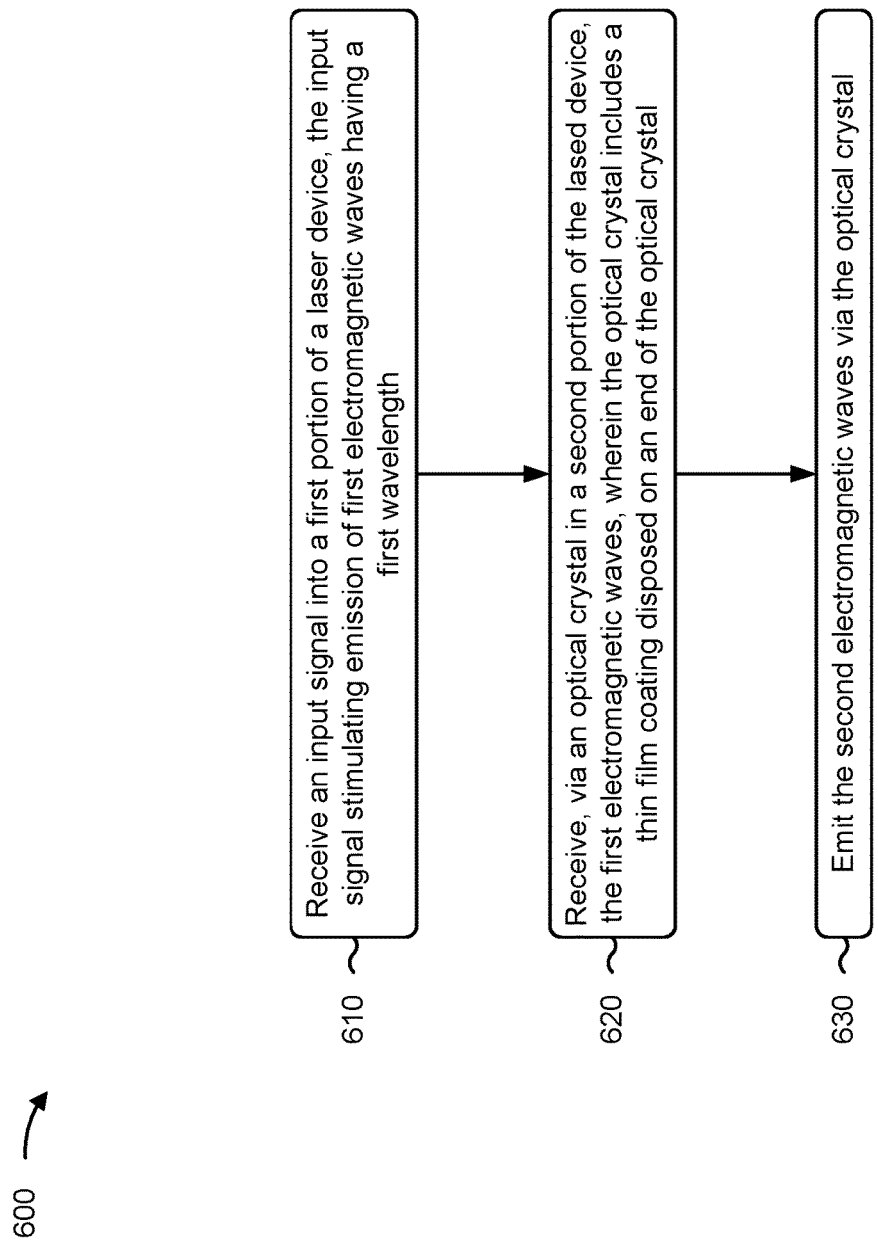
FIGS. 6 and 7 are flowcharts of example processes relating to laser devices described herein.

FIG. 6 is a flowchart of an example process 600 relating to laser devices described herein. For example, process 600 relates to using the laser device. In some implementations, one or more process blocks of FIG. 6 may be performed by one or more laser devices (e.g., laser device 100, laser device 200, laser device 300, and/or laser device 400). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving an input signal into a first portion of a laser device, the input signal stimulating emission of first electromagnetic waves having a first wavelength (block 610). For example, the laser device may receive an input signal 126 into a first portion 112 of the laser device (e.g., laser device 100, 200, 300, and/or 400), the input signal stimulating emission of first electromagnetic waves 122 having a first wavelength, as described above.

As further shown in FIG. 6, process 600 may include receiving, via an optical crystal in a second portion of the laser device, the first electromagnetic waves (block 620). For example, the laser device may receive, via an optical crystal 114 in a second portion of the laser device, the first electromagnetic waves 122, as described herein. In some implementations, the optical crystal 114 includes a thin film coating (e.g., thin film coating 116 or 118) disposed on an end of the optical crystal 114. In some implementations, the thin film coating is configured to emit second electromagnetic waves 124 from the optical crystal 114 based on reception of the first electromagnetic waves 122, and cause internal reflection of the first electromagnetic waves 122 within the optical crystal 114.

As further shown in FIG. 6, process 600 may include emitting the second electromagnetic waves via the optical crystal (block 630). For example, the laser device may emit the second electromagnetic waves 124 via the optical crystal 114, as described herein.

Process 600 may include additional implementations, such as any single implementation or any combination of implementations described below and/or in connection with one or more other processes described elsewhere herein.

In a first implementation, process 600 includes receiving an input (e.g., a control signal 128) at a modulator device 108 within the first portion 112 of the laser device, and modulating, by the modulator device 108, the first electromagnetic waves 122 before reception of the first electromagnetic waves 122 by the optical crystal 114.

In a second implementation, alone or in combination with the first implementation, process 600 includes polarizing the first electromagnetic waves 122 via a polarizer device 302 within the first portion 112 of the laser device.

In a third implementation, alone or in combination with one or more of the first and second implementations, process 600 includes reflecting a portion 124a of the second electromagnetic waves 124, via a beam splitter 202 or 304 and after emission from the optical crystal 114, in a direction that is non-parallel to a transmission path of the first electromagnetic waves 122.

In a fourth implementation, alone or in combination with one or more of the first through third implementations, the end of the optical crystal 114 having the thin film coating 116 disposed thereon is proximate to the first portion 112, an additional end of the optical crystal 114, opposite from the end of the optical crystal 114 having the thin film coating 116 disposed thereon, comprises two or more angled surfaces having a reflective film 118a and 118b disposed thereon, and the reflective film 118a and 118b is configured to cause internal reflection of the first electromagnetic waves 122 and internal reflection of the second electromagnetic waves 124 from the additional end.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
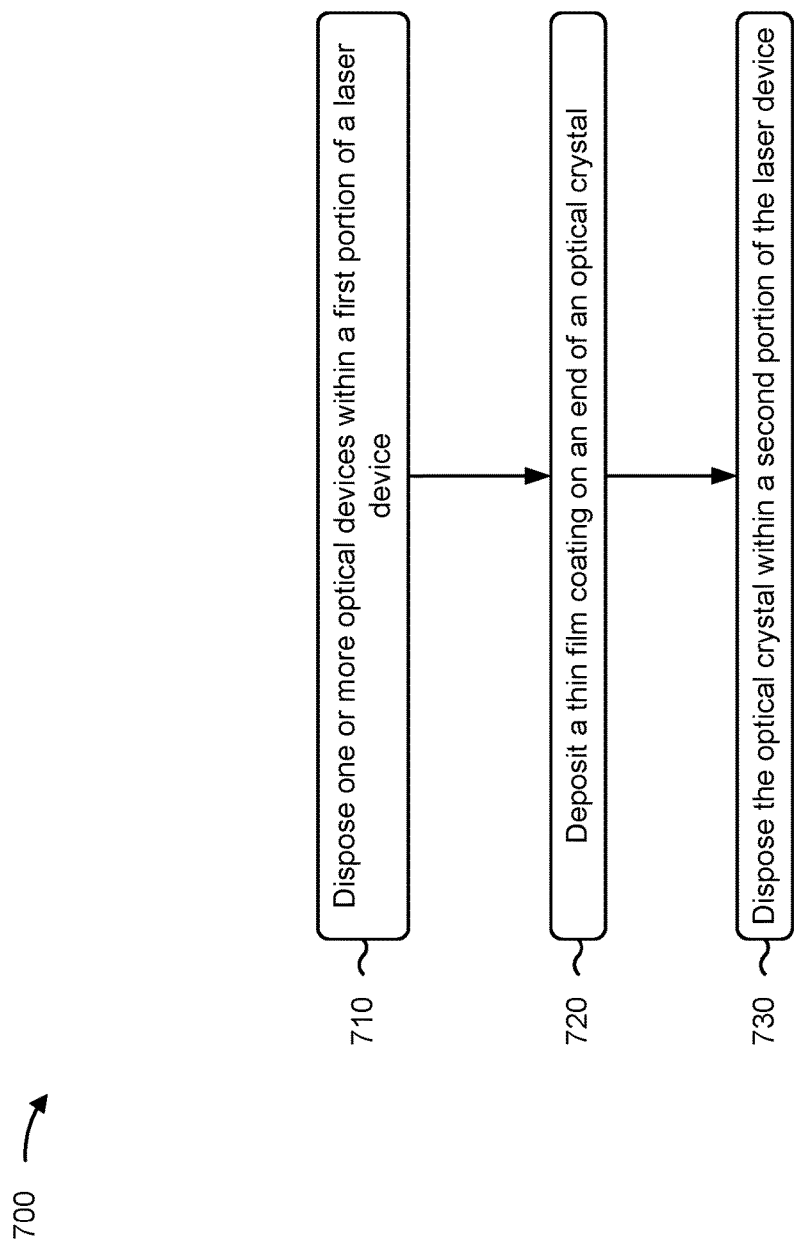

FIG. 7 is a flowchart of an example process 700 relating to laser devices described herein. For example, process 700 relates to using the laser device. In some implementations, one or more process blocks of FIG. 7 may be performed by one or more semiconductor processing tools (e.g., a deposition tool, an etching tool, and/or wafer/die transport tool). Additionally, or alternatively, one or more process blocks of FIG. 7 may be performed by one or more components of device 500, such as processor 520, memory 530, input component 540, output component 550, and/or communication component 560.

As shown in FIG. 7, process 700 may include disposing one or more optical devices within a first portion of a laser device (block 710). For example, the one or more semiconductor processing tools may dispose one or more optical devices (e.g., devices 102-110 and/or 302) within a first portion 112 of a laser device, as described herein. In some implementations, the first portion 112 is configured to emit first electromagnetic waves 122, having a first wavelength, based on reception of an input signal 126.

As further shown in FIG. 7, process 700 may include depositing a thin film coating on an end of an optical crystal, the thin film coating configured to support emission of second electromagnetic waves, having a second wavelength, from the optical crystal based on reception of the first electromagnetic waves, and support internal reflection of the first electromagnetic waves within the optical crystal (block 720). For example, the one or more semiconductor processing tools may deposit a thin film coating (116 or 118) on an end of an optical crystal 114, as described herein. In some implementations, the thin film coating 116 or 118 is configured to support emission of second electromagnetic waves 124, having a second wavelength, from the optical crystal 114 based on reception of the first electromagnetic waves 122, and support internal reflection of the first electromagnetic waves 122 within the optical crystal 114.

As further shown in FIG. 7, process 700 may include disposing the optical crystal within a second portion of the laser device (block 730). For example, the one or more semiconductor processing tools may dispose the optical crystal 114 within a second portion 120 of the laser device, as described herein. In some implementations, the laser device is configured to provide the first electromagnetic waves to the optical crystal within the second portion of the laser device.

Process 700 may include additional implementations, such as any single implementation or any combination of implementations described below and/or in connection with one or more other processes described elsewhere herein.

In a first implementation, depositing the thin film coating (116 or 118) on the end of the optical crystal 114 comprises: depositing the thin film coating on the end of the optical crystal 114 with a thickness T1 or T2 to support emission of the second electromagnetic waves 124 from the optical crystal 114 and to support internal reflection of the first electromagnetic waves 122 within the optical crystal 114, the thickness (T1 or T2) being based on the first wavelength, the second wavelength, and a material of the thin film coating (116 or 118).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
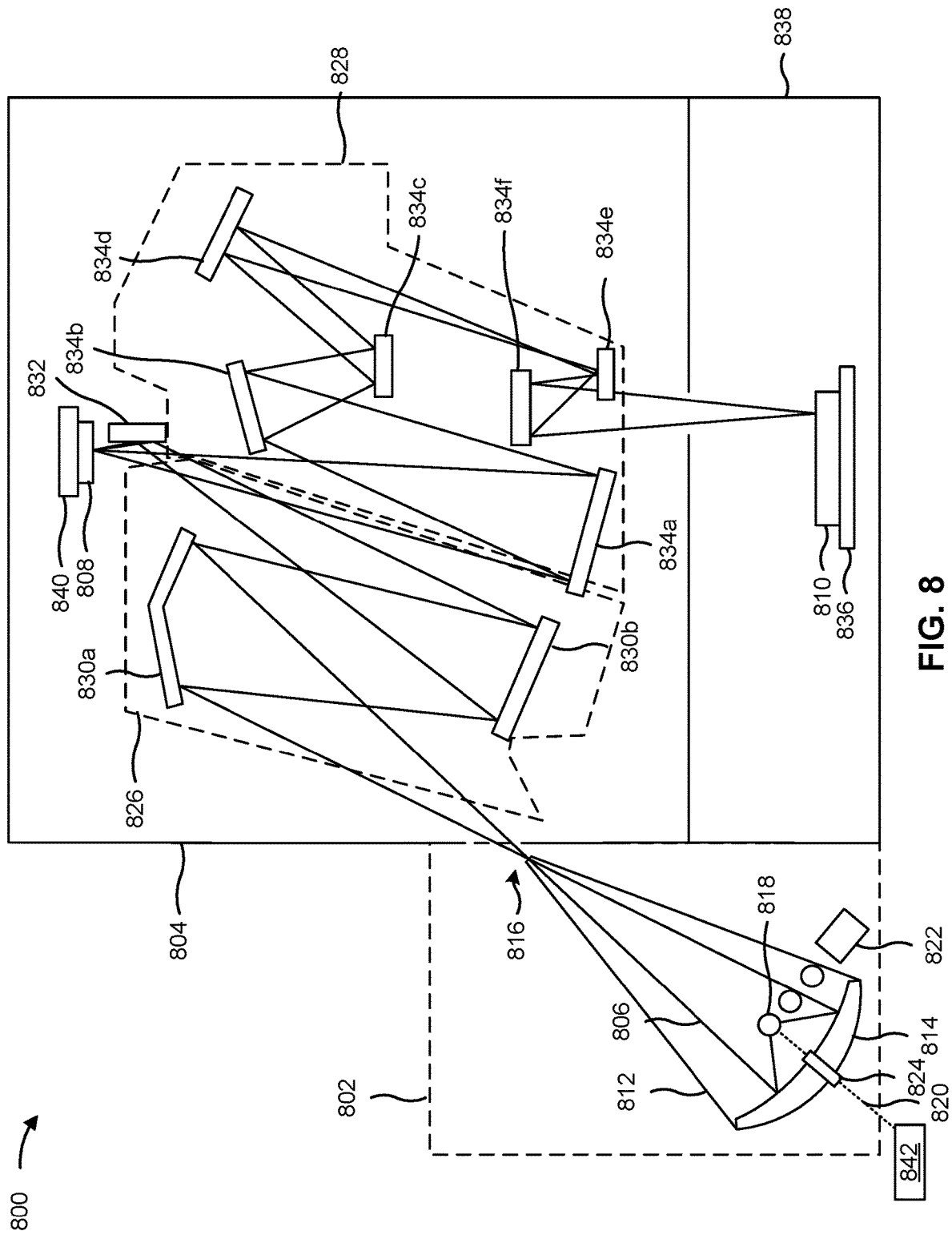
FIG. 8 is a diagram of an example lithography system in which systems and/or methods described herein may be implemented.

FIG. 8 is a diagram of an example lithography system 800 described herein. The lithography system 800 includes an extreme ultraviolet (EUV) lithography system or another type of lithography system that is configured to transfer a pattern to a semiconductor substrate using mirror-based optics. The lithography system 800 may be configured for use in a semiconductor processing environment such as a semiconductor foundry or a semiconductor fabrication facility.

As shown in FIG. 8, the lithography system 800 includes a radiation source 802 and an exposure tool 804. The radiation source 802 (e.g., an EUV radiation source or another type of radiation source) is configured to generate radiation 806 such as EUV radiation and/or another type of electromagnetic radiation (e.g., light). The exposure tool 804 (e.g., an EUV scanner tool, and EUV exposure tool, or another type of exposure tool) is configured to focus the radiation 806 onto a reflective reticle 808 (or a photomask) such that a pattern is transferred from the reticle 808 onto a semiconductor substrate 810 using the radiation 806.

The radiation source 802 includes a vessel 812 and a collector 814 in the vessel 812. The collector 814, includes a curved mirror that is configured to collect the radiation 806 generated by the radiation source 802 and to focus the radiation 806 toward an intermediate focus 816. The radiation 806 is produced from a plasma that is generated from droplets 818 of a target material (e.g., droplets of a target material including Sn droplets or another type of droplets) being exposed to a laser beam 820. The droplets 818 are provided across the front of the collector 814 by a droplet generator (DG) 822. The droplet generator 822 is pressurized to provide a fine and controlled output of the droplets 818. The laser beam 820 is provided such that the laser beam 820 is focused through a window 824 of the collector 814. The laser beam 820 is focused onto the droplets 818 which generates the plasma. The plasma produces a plasma emission, some of which is the radiation 806.

The exposure tool 804 includes an illuminator 826 and a projection optics box (POB) 828. The illuminator 826 includes a plurality of reflective mirrors that are configured to focus and/or direct the radiation 806 onto the reticle 808 so as to illuminate the pattern on the reticle 808. The plurality of mirrors include, for example, a mirror 830a and a mirror 830b. The mirror 830a includes a field facet mirror (FFM) or another type of mirror that includes a plurality of field facets. The mirror 830b includes a pupil facet mirror (PFM) or another type of mirror that also includes a plurality of pupil facets. The facets of the mirrors 830a and 830b are arranged to focus, polarize, and/or otherwise tune the radiation 806 from the radiation source 802 to increase the uniformity of the radiation 806 and/or to increase particular types of radiation components (e.g., transverse electric (TE) polarized radiation, transverse magnetic (TM) polarized radiation). Another mirror 832 (e.g., a relay mirror) is included to direct radiation 806 from the illuminator 826 onto the reticle 808.

The projection optics box 828 includes a plurality of mirrors that are configured to project the radiation 806 onto the semiconductor substrate 810 after the radiation 806 is modified based on the pattern of the reticle 808. The plurality of reflective mirrors include, for example, mirrors 834a-834f. In some implementations, the mirrors 834a-834f are configured to focus or reduce the radiation 806 into an exposure field, which may include one or more die areas on the semiconductor substrate 810.

The exposure tool 804 includes a wafer stage 836 (or a substrate stage) configured to support the semiconductor substrate 810. Moreover, the wafer stage 836 is configured to move (or step) the semiconductor substrate 810 through a plurality of exposure fields as the radiation 806 transfers the pattern from the reticle 808 onto the semiconductor substrate 810. The wafer stage 836 is included in a bottom module 838 of the exposure tool 804. The bottom module 838 includes a removable subsystem of the exposure tool 804. The bottom module 838 may slide out of the exposure tool 804 and/or otherwise may be removed from the exposure tool 804 to enable cleaning and inspection of the wafer stage 836 and/or the components of the wafer stage 836. The bottom module 838 isolates the wafer stage 836 from other areas in the exposure tool 804 to reduce and/or minimize contamination of the semiconductor substrate 810. Moreover, the bottom module 838 may provide physical isolation for the wafer stage 836 by reducing the transfer of vibrations (e.g., vibrations in the semiconductor processing environment in which the lithography system 800 is located, vibrations in the lithography system 800 during operation of the lithography system 800) to the wafer stage 836 and, therefore, the semiconductor substrate 810. This reduces movement and/or disturbance of the semiconductor substrate 810, which reduces the likelihood that the vibrations may cause a pattern misalignment.

The exposure tool 804 also includes a reticle stage 840 that is configured to support and/or secure the reticle 808. Moreover, the reticle stage 840 is configured to move or slide the reticle through the radiation 806 such that the reticle 808 is scanned by the radiation 806. In this way, a pattern that is larger than the field or beam of the radiation 806 may be transferred to the semiconductor substrate 810.

The lithography system 800 includes a laser source 842. The laser source 842 may include laser device 100, laser device 200, and/or laser device 300. The laser source 842 is configured to generate the laser beam 820. The laser source 842 may include a $CO_2$-based laser source or another type of laser source. Due to the wavelength of the laser beams generated by a $CO_2$-based laser source in an infrared (IR) region, the laser beams may be highly absorbed by tin, which enables the $CO_2$-based laser source to achieve high power and energy for pumping tin-based plasma. In some implementations, the laser beam 820 includes a plurality of types of laser beams that the laser source 842 generates using a multi-pulse technique (or a multi-stage pumping technique), in which the laser source 842 generates a pre-pulse laser beam and main-pulse laser beam to achieve greater heating efficiency of tin (Sn)-based plasma to increase conversion efficiency.

In an example exposure operation (e.g., an EUV exposure operation), the droplet generator 822 provides the stream of the droplets 818 across the front of the collector 814. The laser beam 820 contacts the droplets 818, which causes a plasma to be generated. The laser source 842 generates and provides a pre-pulse laser beam toward a target material droplet in the stream of the droplets 818, and the pre-pulse laser beam is absorbed by the target material droplet. This transforms the target material droplet into disc shape or a mist. Subsequently, the laser source 842 provides a main-pulse laser beam with large intensity and energy toward the disc-shaped target material or target material mist. Here, the atoms of the target material are neutralized, and ions are generated through thermal flux and shock wave. The main-pulse laser beam pumps ions to a higher charge state, which causes the ions to radiate the radiation 806 (e.g., EUV light).

The radiation 806 is collected by the collector 814 and directed out of the vessel 812 and into the exposure tool 804 toward the mirror 830a of the illuminator 826. The mirror 830a reflects the radiation 806 onto the mirror 830b, which reflects the radiation 806 onto the mirror 832 toward the reticle 808. The radiation 806 is modified by the pattern in the reticle 808. In other words, the radiation 806 reflects off of the reticle 808 based on the pattern of the reticle 808. The reflective reticle 808 directs the radiation 806 toward the mirror 834a in the projection optics box 828, which reflects the radiation 806 onto the mirror 834b. The radiation 806 continues to be reflected and reduced in the projection optics box 828 by the mirrors 834c-834f. The mirror 834f reflects the radiation 806 onto the semiconductor substrate 810 such that the pattern of the reticle 808 is transferred to the semiconductor substrate 810. The above-described exposure operation is an example, and the lithography system 800 may operate according to other EUV techniques and radiation paths that include a greater quantity of mirrors, a lesser quantity of mirrors, and/or a different configuration of mirrors.

As indicated above, FIG. 8 is provided as an example. Other examples may differ from what is described with regard to FIG. 8. For example, another example may include additional components, fewer components, different components, or differently arranged components than those shown in FIG. 8. Additionally, or alternatively, a set of components (e.g., one or more components) of FIG. 8 may perform one or more functions described herein as being performed by another set of components.

Based on using an optical crystal as a resonator for a laser device with one or more thin film coatings at one or more ends of the optical crystal (e.g., a backwards end or a forward end along a transmission path of the laser device), mirror devices having thin film coatings surrounding the optical crystal may be unnecessary. This may allow a manufacturing process for the laser device to avoid unnecessary cost and consumption of resources to provide the mirror devices having thin film coatings. Additionally, the first electromagnetic waves and the second electromagnetic waves may reduce travel between devices (e.g., between the optical crystal and mirror devices having the thin film coatings), which may reduce energy losses from colliding with particles and/or may reduce scattering from thin film coating roughness. In this way, the laser device may have improved energy efficiency and/or reduced manufacturing cost and/or time, among other examples.

As described in greater detail above, some implementations described herein provide a laser device. The laser device includes a first portion of the laser device, at a proximal end of the laser device, that includes one or more optical devices, where the first portion is configured to emit first electromagnetic waves having a first wavelength. The laser device includes a second portion of the laser device, at a distal end of the laser device, that includes an optical crystal configured to receive the first electromagnetic waves and to emit second electromagnetic waves having a second wavelength based on reception of the first electromagnetic waves, where the optical crystal includes a thin film coating disposed on an end of the optical crystal, the thin film coating configured to: support emission of the second electromagnetic waves from the optical crystal, and support internal reflection of the first electromagnetic waves within the optical crystal.

As described in greater detail above, some implementations described herein provide a method. The method includes receiving an input signal into a first portion of a laser device, the input signal stimulating emission of first electromagnetic waves having a first wavelength. The method also includes receiving, via an optical crystal in a second portion of the laser device, the first electromagnetic waves. The optical crystal includes a thin film coating disposed on an end of the optical crystal. The thin film coating is configured to emit second electromagnetic waves from the optical crystal based on reception of the first electromagnetic waves and cause internal reflection of the first electromagnetic waves within the optical crystal. The method further includes emitting the second electromagnetic waves via the optical crystal.

As described in greater detail above, some implementations described herein provide a method. The method includes disposing one or more optical devices within a first portion of a laser device. The first portion is configured to emit first electromagnetic waves, having a first wavelength, based on reception of an input signal. The method also includes depositing a thin film coating on an end of an optical crystal. The thin film coating is configured to support emission of second electromagnetic waves, having a second wavelength, from the optical crystal based on reception of the first electromagnetic waves, and support internal reflection of the first electromagnetic waves within the optical crystal. The method further includes disposing the optical crystal within a second portion of the laser device, where the laser device is configured to provide the first electromagnetic waves to the optical crystal within the second portion of the laser device.

As described in greater detail above, some implementations described herein provide a method. The method includes emitting electromagnetic waves, toward an object to be inspected, by a laser device. The laser device includes a first portion of the laser device, where the first portion configured to emit first electromagnetic waves having a first wavelength. The laser device also includes a second portion of the laser device, where the second portion includes an optical crystal configured to receive the first electromagnetic waves and to emit second electromagnetic waves having a second wavelength based on reception of the first electromagnetic waves. The optical crystal includes a thin film coating disposed on an end of the optical crystal, the thin film coating configured to support emission of the second electromagnetic waves from the optical crystal and to support internal reflection of the first electromagnetic waves within the optical crystal. The method also includes receiving a portion of the electromagnetic waves after reflection or refraction off of one or more surfaces of the object. The method may further include analyzing images of the object based on reception of the electromagnetic waves emitted by the laser device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A laser device, comprising:
a first optical crystal, at a proximal end of the laser device, configured to emit first electromagnetic waves having a first wavelength; and
a second optical crystal, at a distal end of the laser device, configured to receive the first electromagnetic waves and to emit second electromagnetic waves having a second wavelength based on reception of the first electromagnetic waves,
wherein the second optical crystal comprises:
a first end having a thin film coating disposed thereon, and
a second end comprising two angled surfaces that each has a reflective film disposed thereon, wherein the two angled surfaces are formed with angles that are symmetric about a logical axis that is parallel to a transmission path in a direction from the proximal end of the laser device to the distal end of the laser device.

2. The laser device of claim 1, wherein the first optical crystal is further configured to generate the first electromagnetic waves.

3. The laser device of claim 1, further comprising:
a modulator device, at the proximal end of the laser device, configured to modulate the first electromagnetic waves before providing the first electromagnetic waves to the second optical crystal.

4. The laser device of claim 3, wherein to modulate the first electromagnetic waves, the modulator device is configured to:
form pulses of the first electromagnetic waves based on a control signal.

5. The laser device of claim 1, wherein the second end of the second optical crystal comprises a second thin film coating disposed thereon,
wherein the second thin film coating is configured to:
support reception of the first electromagnetic waves into the second optical crystal, and
support internal reflection of the second electromagnetic waves within the second optical crystal.

6. The laser device of claim 1, wherein the first end of the second optical crystal is proximate to the first optical crystal, and
wherein the second end of the second optical crystal is opposite from the first end of the second optical crystal.

7. The laser device of claim 1, wherein the thin film coating is configured to support emission of the second electromagnetic waves from the second optical crystal and to support internal reflection of the first electromagnetic waves within the second optical crystal based on:
the first wavelength,
the second wavelength,
a material of the thin film coating, and
a thickness of the thin film coating.

8. The laser device of claim 1, wherein the distal end of the laser device is free from a mirror device disposed along a transmission path of the second electromagnetic waves after emission from the second optical crystal.

9. The laser device of claim 1, wherein the reflective film of each of the two angled surfaces of the second end is configured to support internal reflection of the first electromagnetic waves and the second electromagnetic waves.

10. The laser device of claim 1, wherein the first electromagnetic waves is received by the second optical crystal from a first direction, and wherein the second electromagnetic waves is emitted by the second optical crystal in a second direction that is different from the first direction.

11. The laser device of claim 10, further comprising:
a beam splitter, at a distal end of the laser device, configured to reflect a portion of the second electromagnetic waves, after emission by the second optical crystal, in a third direction that is different from the first direction and the second direction.

12. The laser device of claim 11, further comprising:
a polarizer device, at the proximal end of the laser device, configured to polarize the first electromagnetic waves before the second optical crystal receives the first electromagnetic waves,
wherein the beam splitter is a polarized beam splitter that is configured to reflect the portion of the second electromagnetic waves in the third direction based on a polarity of the second electromagnetic waves.

13. A method, comprising:
receiving, via a gain device in a first portion of a laser device, an input signal stimulating emission of first electromagnetic waves having a first wavelength;
receiving, via an optical crystal in a second portion of the laser device, the first electromagnetic waves,
wherein the optical crystal comprises:
a first end having a thin film coating disposed thereon, wherein the thin film coating is configured to:
emit second electromagnetic waves from the optical crystal based on reception of the first electromagnetic waves, and
cause internal reflection of the first electromagnetic waves within the optical crystal, and
a second end comprising two angled surfaces that each has a reflective film disposed therein, wherein the two angled surfaces are formed with angles that are symmetric about a logical axis that is parallel to a transmission path in a direction from the first portion of the laser device to the second portion of the laser device; and
emitting the second electromagnetic waves via the optical crystal.

14. The method of claim 13, further comprising:
receiving an input at a modulator device in the first portion, and
modulating, by the modulator device, the first electromagnetic waves before reception of the first electromagnetic waves by the optical crystal.

15. The method of claim 13, further comprising:
polarizing the first electromagnetic waves via a polarizer device in the first portion.

16. The method of claim 13, further comprising:
reflecting a portion of the second electromagnetic waves, via a beam splitter and after emission from the optical crystal, in a direction that is non-parallel to a transmission path of the first electromagnetic waves.

17. The method of claim 13, wherein the first end of the optical crystal is proximate to the first portion, and
wherein the second end of the optical crystal is opposite from the first end of the optical crystal having the thin film coating disposed thereon.

18. The method of claim 13, wherein the reflective film is configured to cause internal reflection of the first electromagnetic waves and internal reflection of the second electromagnetic waves from the second end.

19. A method, comprising:
emitting electromagnetic waves, toward an object to be inspected, by a laser device that comprises:
a first optical crystal, at a first portion of the laser device, configured to emit first electromagnetic waves having a first wavelength; and
a second optical crystal, at a second portion of the laser device, configured to receive the first electromagnetic waves and to emit second electromagnetic waves having a second wavelength based on reception of the first electromagnetic waves,
wherein the second optical crystal comprises:
a first end having a thin film coating disposed thereon, the thin film coating configured to support emission of the second electromagnetic waves from the second optical crystal and to support internal reflection of the first electromagnetic waves in the second optical crystal, and
a second end comprising two angled surfaces that each has a reflective film disposed thereon, wherein the two angled surfaces are formed with angles that are symmetric about a logical axis that is parallel to a transmission path in a direction from the first portion of the laser device to the second portion of the laser device; and
receiving a portion of the electromagnetic waves after reflection or refraction off of one or more surfaces of the object.

20. The method of claim 19, further comprising:
analyzing images of the object based on reception of the electromagnetic waves emitted by the laser device.

* * * * *